United States Patent [19]

Hinsberg, III et al.

[11] Patent Number: 5,625,579
[45] Date of Patent: Apr. 29, 1997

[54] STOCHASTIC SIMULATION METHOD FOR PROCESSES CONTAINING EQUILIBRIUM STEPS

[75] Inventors: William D. Hinsberg, III; Frances A. Houle, both of Fremont, Calif.

[73] Assignee: International Business Machines Corporation, Armonk, N.Y.

[21] Appl. No.: 241,316

[22] Filed: May 10, 1994

[51] Int. Cl.⁶ .......................................................... G06G 7/48
[52] U.S. Cl. ........................... 364/578; 364/496; 364/497; 364/498
[58] Field of Search .................... 395/500; 364/578, 364/496, 497, 498, 499, 500; 425/143, 384

[56] References Cited

U.S. PATENT DOCUMENTS

| | | | |
|---|---|---|---|
| 3,702,009 | 10/1972 | Baldwin, Jr. | 444/1 |
| 4,219,877 | 8/1980 | Vladimirov et al. | 364/554 |
| 4,383,757 | 5/1983 | Phillips | 355/53 |
| 4,513,384 | 4/1985 | Rosencwaig | 364/563 |
| 4,534,003 | 8/1985 | Manzione | 364/476 |
| 4,632,818 | 12/1986 | Chen et al. | 423/574.1 |
| 4,661,913 | 4/1987 | Wu et al. | 364/500 |
| 4,670,404 | 6/1987 | Swift et al. | 436/147 |
| 4,751,637 | 6/1988 | Catlin | 364/200 |
| 4,758,533 | 7/1988 | Magee et al. | 437/173 |
| 4,819,161 | 4/1989 | Konno et al. | 364/300 |
| 4,828,224 | 5/1989 | Crabb et al. | 251/298 |
| 4,834,866 | 5/1989 | Schmidt | 208/65 |
| 4,841,479 | 6/1989 | Tsuji et al. | 364/900 |
| 4,908,784 | 3/1990 | Box et al. | 364/569 |
| 4,933,883 | 6/1990 | Pennebaker et al. | 364/554 |
| 4,935,882 | 6/1990 | Pennebaker et al. | 364/554 |
| 4,967,014 | 10/1990 | Masamoto | 568/458 |
| 4,985,860 | 1/1991 | Vlach | 364/578 |
| 4,988,166 | 1/1991 | Cook | 350/321 |
| 5,003,118 | 3/1991 | Low et al. | 585/253 |
| 5,019,998 | 5/1991 | Cowan et al. | 364/496 |

(List continued on next page.)

FOREIGN PATENT DOCUMENTS

| | | |
|---|---|---|
| 226964 | 11/1969 | U.S.S.R. |
| 458839 | 3/1975 | U.S.S.R. |
| 482733 | 12/1975 | U.S.S.R. |
| 498622 | 8/1976 | U.S.S.R. |
| 717776 | 2/1980 | U.S.S.R. |
| 721814 | 3/1980 | U.S.S.R. |
| 741297 | 6/1980 | U.S.S.R. |
| 868771 | 9/1981 | U.S.S.R. |
| 888115 | 12/1981 | U.S.S.R. |
| 960833 | 9/1982 | U.S.S.R. |
| 999063 | 2/1983 | U.S.S.R. |
| 062695 | 12/1983 | U.S.S.R. |

OTHER PUBLICATIONS

P. J. Haas and G. S. Shedler, Simulation Algorithm for Passage Times in Colored Stochastic Petrinets, IBM TDB vol. 35, No. 1A, Jun. 1992, pp. 186–188.

(List continued on next page.)

Primary Examiner—Kevin J. Teska
Assistant Examiner—Jacques Louis-Jacques
Attorney, Agent, or Firm—James C. Pintner

[57] ABSTRACT

A system and method for simulating a mechanistic kinetic process, such as a chemical process including one or more chemical reactions, over a predetermined time period is provided. The simulation proceeds stochastically, by taking discrete time steps through the time period, and performing events (i.e., chemical reactions), based on the relationship between their probabilities of occurrence and the time steps taken. The system and method of the invention include means or method steps for detecting equilibrium conditions, in which a reaction moves forward and backward with a reaction probability which is high, relative to the probabilities of other reactions being simulated. When a reaction in equilibrium is detected, a probability calculation is made, based on the non-equilibrium reactions being simulated. Time steps are made, and events are simulated, based only on the non-equilibrium reactions. Thus, processing time, which would otherwise be consumed simulating back-and-forth events in the equilibrium reaction, is saved.

18 Claims, 8 Drawing Sheets

U.S. PATENT DOCUMENTS

| | | | |
|---|---|---|---|
| 5,029,119 | 7/1991 | Konno | 364/578 |
| 5,079,731 | 1/1992 | Miller et al. | 364/578 |
| 5,081,601 | 1/1992 | Eirikasson | 364/578 |
| 5,157,620 | 10/1992 | Shaar | 364/578 |
| 5,202,843 | 4/1993 | Kunimine et al. | 364/578 |
| 5,360,534 | 11/1994 | Rice et al. | 208/139 |
| 5,362,917 | 11/1994 | Ogawa et al. | 568/454 |
| 5,446,870 | 8/1995 | Hinsberg, III et al. | 364/578 |
| 5,448,498 | 9/1995 | Namiki et al. | 364/496 |
| 5,553,004 | 9/1996 | Gronbech-Jensen et al. | 364/578 |

OTHER PUBLICATIONS

C. Bianchi, G. Calzolari and P. Corsi, Stochastic Simulation: A Package for Monte Carlo Experiments on Econometric Models, IBM TDB vol. 20, No. 10, Mar. 1978, pp. 3972–3975.

K. A. Singmaster and F. A. Houle, Laser–Assisted Chemical Vapor Deposition from the Metal Hexacarbonyls, American Chemical Society, 203rd Nat. Meeting of American Chemical Society, San Francisco, CA Apr. 4–10, 1992.

F. A. Houle & K. A. Singmaster, Visible Laser–Induced Nucleation and Growth of Cr, Mo, and W Films from the Hexacarbonyls. Reactivity of CO on Film Surfaces. Reprinted from the Journal of Physical Chemistry, 1992, 96, Sep. 1992.

G. Arthur Mihram, Simulation Statistical Foundations and Methodology, vol. 92 in Mathematics in Science and Engineering pp. 228–230, 1972 Jan. 1972.

N. T. J. Bailey, The elements of Stochastic Processes with Applications to the Natural Sciences, Chapter 7, Markov Processes in Continuous Time, pp. 66–69 no date.

S. J. Lombardo and A. T. Bell, A Review of Theoretical Models of Adsorption, Diffusion, Desorption, and Reaction of Gases on Metal Surfaces, Surface Science Reports 13 (1991) 1–72 North Holland Jan. 1991.

Hinsberg and Houle, MSIMPC v2.0: An Interactive Discrete Chemical Mechanism Simulator for the IBM PC (Laboratory and Classroom Version) IBM Research Report, 7814 (72196 Nov. 8, 1990 Chemistry Nov. 1990.

Bunker, Garrett, Kleindienst and Stevenson, Discrete Simulation Methods in Combustion Kinetics, Univ. of Calif. Irvine, Chemistry Dept. (paper) no date.

Bunker and Houle MSIM4—Discrete Simulator for Kinetic Mechanisms, Univ. of Calif. Irvine, Jul. 12, 1974 (paper).

Gillespie, Exact Stochastic Simulation of Coupled Chemical Reactions, Journal of Physical Chemistry, vol. 81, No. 25, 1977, pp. 2340–2361 Jan. 1977.

Gillespie, A General Method for Numerically Simulating the Stochastic Time Evolution of Coupled Chemical Reactions, Journal of Computational Physics vol. 22, No. 4, Dec. 1976, pp. 403–434.

Formosinho, Markov Chain Simulation of Chemical Reactions in Nonhomogeneous Systems, Journal of Chemical Education, vol. 49, No. 4, Apr. 1982.

Turner, Discrete Simulation Methods for Chemical Kinetics, Journal of Physical Chemistry, vol. 81, No. 25, 1977, pp. 2379–240 Jan. 1977.

Breuer, Honerkamp and Petruccione, A Stochastic Approach to Complex Chemical Reactions, Chemical Physics Letters, vol. 190, No. 3,4, Mar. 6, 1992 pp. 199–201.

Bunker, Garrett, Kleindienst, Stevenson, Discrete Simulation Methods in Combustion Kinetics, Combustion Institue, Combustion and Flame 23, 373–379 (1974) Jan. 1974.

Meyerson, Scott and Tsui, Experimental and Chemical Kinetic Modelling Study of Silicon CVD from Monosilane and Disilane, Chemtronics, vol. 1, Dec. 1986.

Hicks, Urbach, Plummer Dai, Can Pulsed Laser Excitation of Surfaces Be Described by a Thermal Model, Physical Review Letters, vol. 61, No. 22, 28 Nov. 1988, pp. 2588–2591.

Liarokapis and Raptis, Temperature Rise Induced by a CW Laser Beam Revisted, J. Appl. Phys. 47 (12), 15 Jun. 1985, pp. 5123–5126.

Barbero, Banon, Benito Santamaria, Stochastic Simulation Methods for Pollution Kinetics, Univ. Complutense, Madrid–3, 1984 Jan. 1984.

STOCHASTIC SIMULATION METHOD FOR PROCESSES CONTAINING EQUILIBRIUM STEPS

FIELD OF THE INVENTION

The invention generally relates to the field of simulation of mechanistic kinetic processes, such as physical or chemical processes. More specifically, the invention relates to an improvement in efficiency of simulation of such processes, where equilibrium conditions are encountered.

BACKGROUND OF THE INVENTION

Certain types of simulators, which simulate processes such as chemical reactions, have operated by solving differential reaction-rate equations. See, for instance, the introductory portion of Gillespie, "Exact Stochastic Simulation of Coupled Chemical Reactions," Journal of Physical Chemistry, vol. 81, page 2340 (1977). Because such equations usually cannot be solved analytically, computerized numerical approximations have been used. However, such simulations are based on the not-always-realistic premises that the reactions are continuous and deterministic. First, computerized numerical solutions of such differential equations are inherently based on discrete points in time, rather than on a continuous time flow. Also, in the context of simulation through solution of such differential reaction rate equations, Gillespie describes "deterministic" as being an unrealistic condition, because molecular populations can only change by discrete integer amounts, and because the exact positions and velocities of the individual molecules, which must be taken into account for a fully deterministic analysis, are not available.

By contrast, stochastic simulators have been used to make discrete time simulations of chemical processes. Stochastic simulators operate by tracing a set of individual events which may occur over a time period during which the process is to be simulated. The simulators operate in a stepwise fashion, in terms of an independent state variable. The independent state variable is typically time, and the simulation operates over a given domain of values for the independent state variable, such as from an initial time to a conclusion time, or from an initial state at an initial time until a final state is reached.

The simulator makes a determination that each of the events has a certain probability of occurrence, which is determined by the system conditions and material properties, at any specific point of time. Typically, the probability is a function of the concentrations of the reactants, and of other factors such as temperature, pressure, etc. In a predefined time-window or interval, which is commonly referred to as a time step, any one of the simulated events may occur. There is, on the average, one occurrence of an event within a time step when the length of that time step is selected to be equivalent to the inverse of the total probability of occurrence of all events. The likelihood of occurrence of a certain event within that time step is proportional to the rate for that individual event.

A stochastic simulator commonly comprises at least one processor which is programmed to define a time step, based on the sum total of the reaction rates for all of the reactions being simulated, and then to randomly select one of those reactions, for which there will be an event which is to take place in that time step. The likelihood of an event being randomly selected is proportional to the probability of occurrence of the selected event, relative to that of the other events. As the consequence of the occurrence of the selected event, the processor updates the system conditions by use of material property tables, system process equations and other required data groups stored in at least one data storage apparatus. The system update may change the probabilities of occurrence of the events, resulting in a different total probability and a different time step. The processor then selects a new time step and repeats the event selection and system condition update processes, to propagate a system through the entire time span for system simulation.

A stochastic simulator was first used to simulate a spatially homogeneous chemical system where many chemical reactions occur (D. L. Bunker et al., Combustion and Flame, vol. 23, p. 373, 1974). The probability of an individual chemical reaction is dependent on the rate constants, and on the concentrations of a variety of chemical reactants. The functional dependence and the concentrations are stored in the storage apparatus. The processor generates a random number between 0 and 1 to select among various chemical reactions a specific reaction in each time step, thus allowing the simulation to propagate in time. The time base for determining the length of time step is based on the total sum of all reaction probabilities.

Additional pioneering work was done by Bunker and Houle in "User's Manual: MSIM4—Discrete Simulator for Kinetic Mechanisms," Univ. of California, Irvine, Jul. 12, 1974, and by Hinsberg and Houle in "MSIMPC v2.0: An Interactive Discrete Chemical Mechanism Simulator for the IBM PC (Laboratory and Classroom Version)," IBM RJ 7814 (Nov. 8, 1990), to implement a simulator similar to that of Bunker and Houle for the IBM Personal Computer.

Another chemical simulator has been developed by Gillespie wherein, for each stochastic time step, the simulator generates two random numbers, each between 0 and 1. The first random number is used for selecting a chemical reaction event which is to be simulated. The probabilities of all of the possible reactions are normalized from 0 to 1. Thus, the range from 0 to 1 is divided up into subintervals, each subinterval being assigned to one of the reactions, and having a size proportional to that reaction's probability. The first random number falls within the subinterval of one of the reactions. That reaction is selected as the event.

The second random number is used for properly weighting the time base used for time step determination. The reciprocal of the sum of the reaction rate, which is a time interval, is used to calculate a time step $\tau$ for the simulation, using a formula such as $$\tau = \frac{-\ln R}{\sum_j \text{rate}_j} \quad (1)$$

where $\text{rate}_j$ is the reaction rate of the j-th reaction of the simulation, and R is the second random number between 0 and 1. It will be seen that, for such stochastic simulations, time steps need not be uniform in size, or predictable. (Gillespie, "A General Method for Numerically Simulating the Stochastic Time Evolution of Coupled Chemical Reactions," Journal of Computational Physics, Vol. 22, No. 4, pp. 403–434, 1976). Better accuracy is achieved with this method than with Bunker's method, when fluctuating systems are involved.

In both the Bunker and the Gillespie simulators, the probability for each possible reaction is determined from the rate of that reaction, and these rates are added to produce a total reaction rate, or, equivalently, a total probability of any reaction taking place. The reaction probabilities may be thought of as normalized reaction rates, since the probability has a value ranging from 0 to 1. A reaction probability $P_i$ for an i-th reaction in a system in which j number of reactions are to take place, may be given by the expression $$P_i = \frac{\text{rate}_i}{\sum_j \text{rate}_j} \quad (2)$$

where the $\text{rate}_i$ and $\text{rate}_j$ expressions are the non-normalized reaction rates.

The Gillespie and Bunker references used the terms "rate" and "probability" more or less interchangably. However, in the present specification, a rigorous distinction will be made between "rate" and "probability," to explain clearly how each relates to the stochastic simulations being described.

Conventional stochastic simulators have a drawback, however, related to the issue of computational efficiency. Frequently, a system to be simulated, which includes a set of chemical reactions, will include one or more reversible reactions. If a reaction is reversible, the simulation may encounter conditions under which the reversible reaction or reactions are in equilibrium. Moreover it will sometimes be the case that a reaction in equilibrium will also have a reaction probability, in either direction, much greater (such as, several orders of magnitude greater) than the other, non-equilibrium, reactions in the simulation. Thus, in long stretches of computer simulation time, the reactants shuffle back and forth in the two complementary equilibrium steps, and only rarely move the simulation toward completion by undergoing the non-equilibrium reaction. The processing time in between successive occurrences of the non-equilibrium reaction is, in effect, wasted, because it does not produce a material change in the state of the system being simulated. Simulations in which such equilibrium reactions occur have been of limited use in solving many problems of scientific and technological interest, because the calculations are simply too slow to be of practical use.

The Bunker and Houle MSIM4 simulator, referred to above, attempts to overcome this computational efficiency problem by using a pattern recognition routine which identifies steps which have entered equilibrium, halts the simulation, and sends an interactive message to the system operator. The user then circumvents the equilibrium by combining the equilibrium step with other steps of the simulated process, to avoid explicit simulation of the equilibrium step. One way to do this is to add together the stoichiometries of the equilibrium step and the non-equilibrium step, and then to multiply the rate constant by the equilibrium constant. However, this approach to solving the computational efficiency problem has certain limitations. First, it requires prior knowledge of the system to be simulated, and this knowledge may not be available to the user. Second, it cannot be applied in all possible simulations, but only to those simulations with appropriate preconditions. Third, systems in which transient equilibrium conditions occur only during certain time segments of the process require each segment of the process, with differing behavior, to be analyzed and solved independently, resulting in inefficient and inconvenient operation.

SUMMARY OF THE INVENTION

It is thus an object of the invention to provide a method and system for performing stochastic simulations which avoids the wasted processing time resulting from the simulation of high-probability, equilibrium reactions as described above, while also avoiding the limitations of the Bunker/Houle technique.

To achieve this and other objectives, there is provided in accordance with the invention a method and system for stochastic simulation of a process including at least one equilibrium reaction, where the reaction or reactions in equilibrium are dynamically excluded from the simulation for certain intervals, during which only non-equilibrium reactions are simulated. Throughout the simulation, the reactions are tested for two conditions. The first condition is that a reaction is in equilibrium. The second condition is that a reaction has a high reaction rate, relative to other reactions of the mechanism being simulated.

From time to time, one or more reactions of the mechanism being simulated will meet both of these tests. The simulation calculates a time step based on reaction probabilities, but disregarding the probability of the reaction or reactions which met the two consitions. A reaction, other than the reaction or reactions meeting both of the tests is selected, and an event of that selected reaction is simulated.

Afterward, the test for the equilibrium condition is started fresh. Therefore, if the equilibrium condition is short-lived, the reaction or reactions previously found to be in equilibrium are not excluded beyond the time at which the equilibrium condition ceases. On the other hand, as long as the reaction or reactions remain in equilibrium, the equilibrium condition will continue to be detected, and the reaction or reactions will be excluded each successive time the test is completed.

Thus, when the method according to the invention detects the equilibrium condition, it takes into consideration only the non-equilibrium reactions, and the stochastic time step is calculated based only on the instantaneous reaction rates of the non-equilibrium reactions. Such a simulation of a chemical process is treated as a Poisson process, a process in which a rare non-equilibrium event occurs infrequently, in a context of many occurrences of much more common equilibrium events. For background on Poisson processes, see, for instance, Bailey, "The Elements of Stochastic Processes With Applications to the Natural Sciences," New York: John Wiley & Sons, Inc. (1964), pp. 66–69.

The method comprises the following steps: The method of the invention is used in the course of performing a stochastic simulation, wherein reaction probabilities at any given point depend on factors set up as part of the simulation, or on factors intrinsic to the type of system being simulated, such as temperature for endothermic or exothermic reactions, pressure for reactions which produce or consume gaseous species, etc. As a first method step a test is made to determine whether one or more reactions of the process are in equilibrium and have relatively high reaction rates. This is done in a conventional manner, such as that disclosed in the Bunker and Houle MSIM4 simulator manual, referred to above.

A second step of the method of the invention is to calculate a total reaction rate for non-equilibrium reactions of the process. In the typical context in which the method of the invention is to operate, where the equilibrium reaction or reactions have higher rates than the non-equilibrium reaction or reactions, this calculated total rate will be lower than that for the high rate, equilibrium reaction or reactions.

Finally, the method includes the steps, based on the total of the reaction rates for the non-equilibrium steps, of making a time step, selecting one of the non-equilibrium events, simulating the selected non-equilibrium event, and updating a state of the system. Because the total of the reaction rates for the non-equilibrium reactions is smaller than that for all of the reactions, the time step will be correspondingly larger. Thus, a large number of equilibrium events which would have occurred during this larger time step are skipped over, saving processing time. A time step is calculated, using an equation identical to equation (1), except that the denominator only sums the reaction rates of non-equilibrium reactions. Then, one of the non-equilibrium events is selected and simulated, and the state of the system is updated. Note that the state of the process, following this update, is the same (or substantially the saline, taking into account random variations in which of the directions of the equilibrium reaction would have been simulated how many times) as it would have been if all of the equilibrium events during the time step had in fact been simulated. Computer experiments using an implementation of the method of the invention have produced excellent conformity between conventional results and results using the method of the invention, at substantial time savings.

During the course of the simulation of a system, reactions will, from time to time, go into and out of equilibrium. Accordingly, the test for the equilibrium condition is ongoing. In a preferred embodiment, a sequence of events is collected and examined, and statistical information which is used to detect equilibrium is obtained from the sequence. After the test is made, the sequence is discarded, and the simulator begins collecting a fresh batch of events for the next equilibrium test. Thus, if a reaction, formerly in equilibrium, passes out of equilibrium, the next equilibrium test will so indicate.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Figure 1:
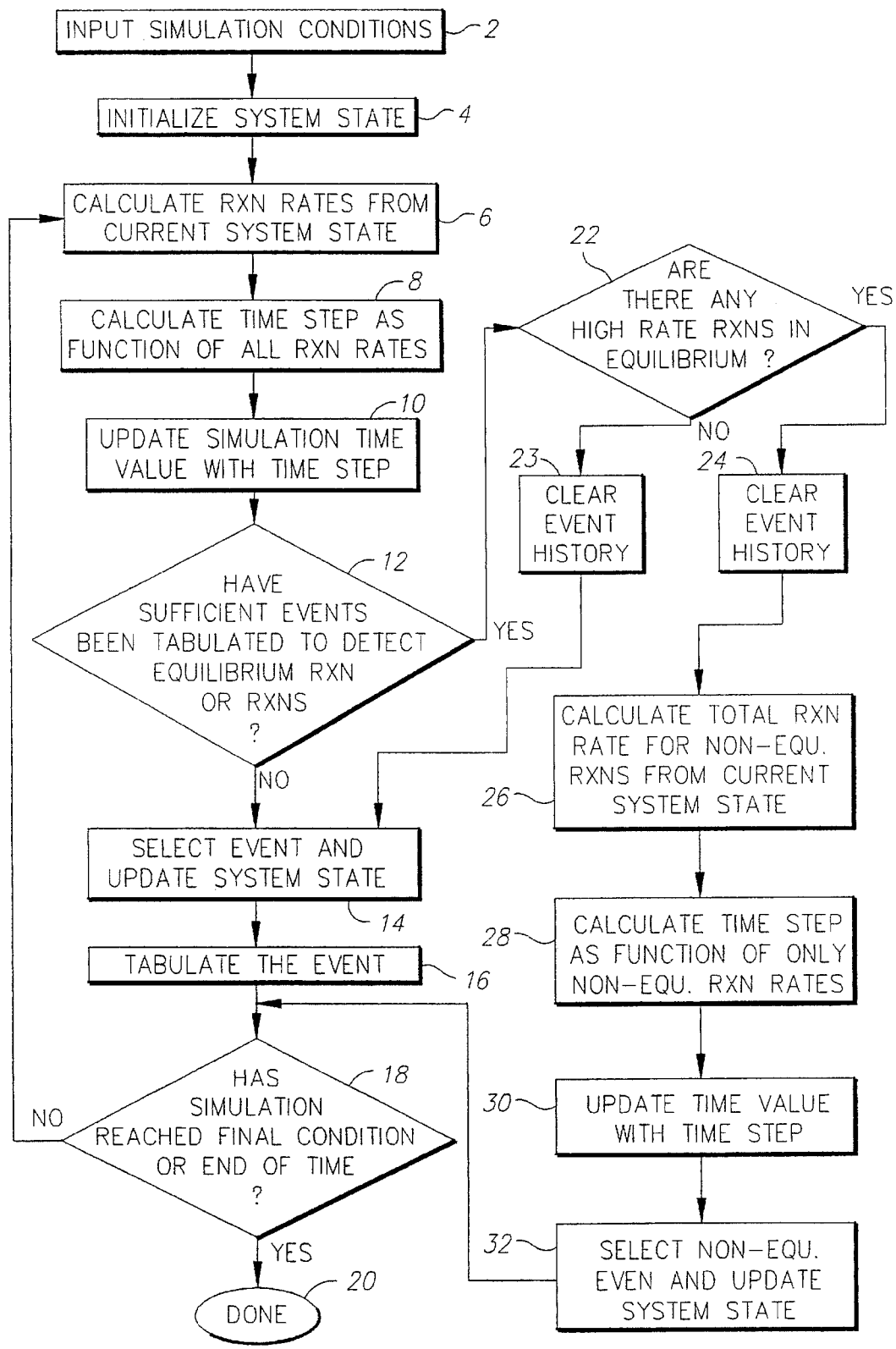
FIG. 1 is a flowchart of a stochastic simulation process incorporating a method, in accordance with the invention, for performing the simulation when equilibrium conditions exist.

FIG. 1 is a flowchart of a stochastic simulation process. The illustrated process includes a method, in accordance with the invention, for dealing with situations in which a large amount of simulation processing power is likely to be expended unproductively. Such a situation comes up in a stochastic simulation when two conditions are simultaneously met.

The first condition is that one or more reversible reactions, simulated as a pair or pairs of reversible reaction steps in a mechanism, reach an equilibrium state. This condition may be detected in any suitable manner, such as by using the technique described in the Bunker et al. MSIM4 manual, cited above. In this equilibrium diagnosis technique, a sequence of events (occurrences of various reaction steps) is collected. An array of suitable length is used to store information on occurrences of the reaction steps which takes place during the simulation, noting the direction of each reaction step. When a suitably large sample of occurrences of this reaction have been saved, the contents of the array are examined. If the ratio of forward to backward occurrences of a reaction step is sufficiently close to 1:1 to satisfy a predetermined threshold ratio, then it is established that the simulated pair of reversible reaction steps is currently in equilibrium. Suitable values are selected for the number of samplings and the threshold ratio, so as to allow for appropriate statistical variation, since the individual events making up the simulation are selected stochastically.

While the use of the Bunker et al. data array is one technique for detecting a reaction step in equilibrium, this step may be more broadly described as maintaining occurrence statistics for the various reaction step events. In accordance with the invention, a preferred way of maintaining the performance statistics is by maintaining counts for the occurrences of events for each of the reaction steps (described below). Other equivalent techniques of tabulating the occurrences, will be known to persons skilled in the art of programming.

The second condition is that the reaction steps of the simulation which are not in equilibrium satisfies the criteria for a Poisson process, a process in which a rare event occurs infrequently, relative to a "sea" of occurrences of a common process, the equilibrium reaction step or reaction steps being the common process. This condition may also be tested for using an array technique. A ratio is calculated of the occurrences of the reaction step believed to be frequently selected, to the occurrences of other reactions, when the array is filled. If that ratio is sufficiently great, then it is determined that the reaction has been selected frequently enough, relative to the other, less frequently selected reactions, to satisfy the second condition.

Figure 2:
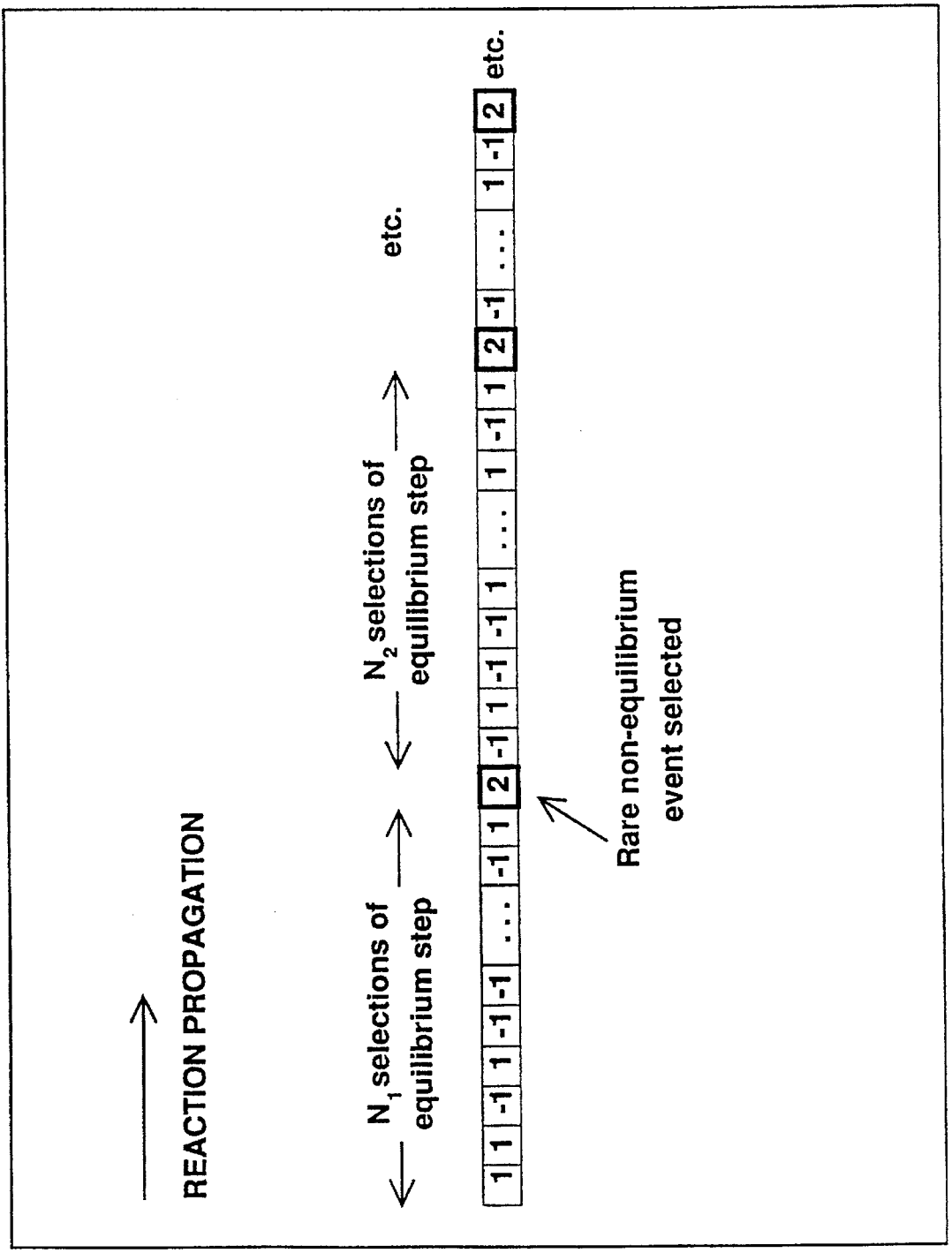
FIG. 2 is a schematic event/time graph of a sequence of events used for detecting a reaction in an equilibrium condition in a stochastic simulation.

FIG. 2 illustrates a sequence of such events. It is assumed that a system is being simulated, in which there are three reactants, A, B, and C, subject to the following reaction steps:

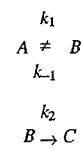

where the reaction rates have the relations $rate_1 \cong rate_{-1} \gg rate_2$, thereby satisfying both of the conditions. This is a simple example, for illustrative purposes, involving only one equilibrium reaction. In a more general case, any reversible reaction of the simulation would be treated as having the capability of going into equilibrium at some point during the simulation.

FIG. 2 may be thought of either as a schematic event/time graph of the sequence of reaction step events, or as a schematic snapshot of a Banker-type array. For convenience, the description which follows will, at some points, describe FIG. 2 as a Bunker-type array. However, it will be understood that, in accordance with the invention, counts are maintained, and incremented for each of the successive events. When a sufficient number of events have taken place, the equilibrium determination is made based on the counts.

Each event is shown schematically as the subscript of the reaction rate constant. These subscripts are used to designate that the respective events of the respective reaction steps have taken place. It will be seen that the second reaction step, symbolized by the rate constant subscript 2, occurs infrequently. Also, between each occurrence of the second reaction step, there is a large group of occurrences of the equilibrium reaction step, in one or the other direction, shown as the subscripts 1 and −1. Because the above system is simulated stochastically (that is, events are selected randomly), there is no hard and fast pattern to the occurrences of the 1 and −1 subscripts, representing occurrences of the two directions of the equilibrium reaction step. However, the occurrences are counted, and statistics such as occurrence ratios are calculated. If the ratio of 1 occurrences to −1 occurrences is within a predetermined first threshold of 1:1, then the reaction is determined to be in equilibrium. Either a fixed threshold test can be used, or, if desired or suitable, a more elaborate test, using statistical information such as standard deviations, may be used instead.

If the ratio of these 1 and −1 occurrences to the 2 occurrences is sufficiently great, exceeding a second threshold ratio such as 9:1 (i.e., the equilibrium reaction step occurring 90% of the time), then the equilibrium and non-equilibrium reactions are likewise found to be in a Poisson relationship.

When both of these conditions are met, the method of the invention is employed to reduce the amount of processing which is expended to simulate the reaction in equilibrium.

A detailed discussion of the flowchart of FIG. 1 will now be provided. In steps 2 and 4, the simulation is initialized. First, in step 2, setup information for the simulation is provided. This setup information includes information relating to a time interval over which the simulation is to be run. For instance, it might be desired to run the simulation from a starting simulation time, given a set of initial conditions, until a desired final state is reached, such as a state in which all of the initially provided reactants have been consumed, and only desired reaction products remain. Alternatively, the time interval may be specified in terms of a beginning time $t_b$ and an ending time $t_e$.

In step 4, system initialization includes setting the simulation time to the beginning time $t_b$, and initializing the quantities of the various reactants and other suitable system state conditions such as temperature, pressure, etc.

The simulation is to be performed by a suitable computer or processing system. In steps 2 and 4 of the flowchart of FIG. 1, which deal with the initialization of the simulation, the computer or processing system is initialized based on information, defining the simulation, which is input to the computer. Typically, a human operator, preparing to run a simulation of a desired chemical mechanism, will provide the information defining the simulation using a suitable input/output capability of the computer or processing system.

Once the system is initialized, the simulation begins running. As the system runs, and accumulates a history of stochastically simulated events taking place in a series of stochastic time steps, a suitable basis of information, such as counts of reaction step events, or the Bunker et al. data array, is accumulated. Each iteration is performed by executing steps 6, 8, 10, 14, and 16 of FIG. 1.

A series of iterations of the stochastic simulation method is required to obtain a history of events, from which an equilibrium determination is to be made. FIG. 2 shows a sequence of such events.

In step 6, reaction rates for the chemical reactions of the simulation are calculated, based on the current system state (including such factors as current reactant quantities and concentrations, etc.) and on the current temperature, or other appropriate factors. In step 8, the time step is calculated stochastically, based on the reaction probabilities of step 6. A preferred computation technique is that of equation (1). The simulation time value is updated in step 10.

Following this iteration, step 12 is executed, to test for whether sufficient events have been tabulated. This is preferably done by testing whether the total number of tabulated events has reached a desired value. If a Bunker-type array is used, then step 12 is a test for whether the data array is full.

If the condition tested for in step 12 does not exist, then the iteration proceeds as follows: In step 14, an event (i.e., one of the reaction steps) is selected stochastically, such as through the use of the random number technique described above in connection with Bunker and Gillespie. The system state is updated based on that selected event. In step 16, the event chosen is tabulated, preferably by incrementing an event count for that reaction step in that direction, or alternatively, stored, using a suitable representation such as a subscript or code which identifies which reaction step was made, in a Bunker-type data array.

A test is then made in step 18, to determine whether the simulation has run to completion. If a specified ending time was provided in step 2, this is done by testing whether the simulation time (updated in step 10) has reached the time $t_e$ at which the simulation is scheduled to end. If step 2 specified that the end of the simulation is to be where the system reaches a final state, such as a slate in which all of the reactants have been converted to final reaction products (described above), or for some other suitable ending condition, then step 18 tests for such a final system state. If the simulation has run to completion, it is done (step 20). Otherwise, the simulation returns to step 6, and performs another iteration as described above.

Eventually, sufficient events will have taken place to satisfy the test of step 12. When this is so, the test of step 12 directs the simulation to step 22, which makes the two-part test for an equilibrium condition, as described above. If step 22 makes the determination that no high probability equilibrium reaction is present, then the tabulated events are cleared (step 23), and the simulator returns to step 14, to complete the iteration by selecting an event and updating the system state (step 14), and beginning a new tabulation (step 16).

While the preferred mode of operation is to discard all prior events, step 23 could alternatively keep a portion of the events, such as a predetermined number of the most recent events, and accumulate the remainder of the events required to satisfy the test of step 12 with subsequent events. This latter mode of operation may be done, where a Bunker-type array is used, by discarding the least recent part of the contents of the array, and keeping the rest. If reaction step counts are used to tabulate events, one technique is to time stamp the events and thereby keep track of which events are the most recent. Another technique is to use two sets of counts. Where N events, tabulated by a primary set of counters, are required to satisfy step 12, and the most recent M events are to be kept for the next test, M being less than N, a secondary set of counters ignore the first N–M events, and then begin tabulating the last M events. Thus, the secondary counters tabulate the next M events, and then have the right number of events to satisfy step 12. Depending on the values of M and N, the primary and secondary sets of counters can trade off alternating equilibrium tests.

Figure 3:
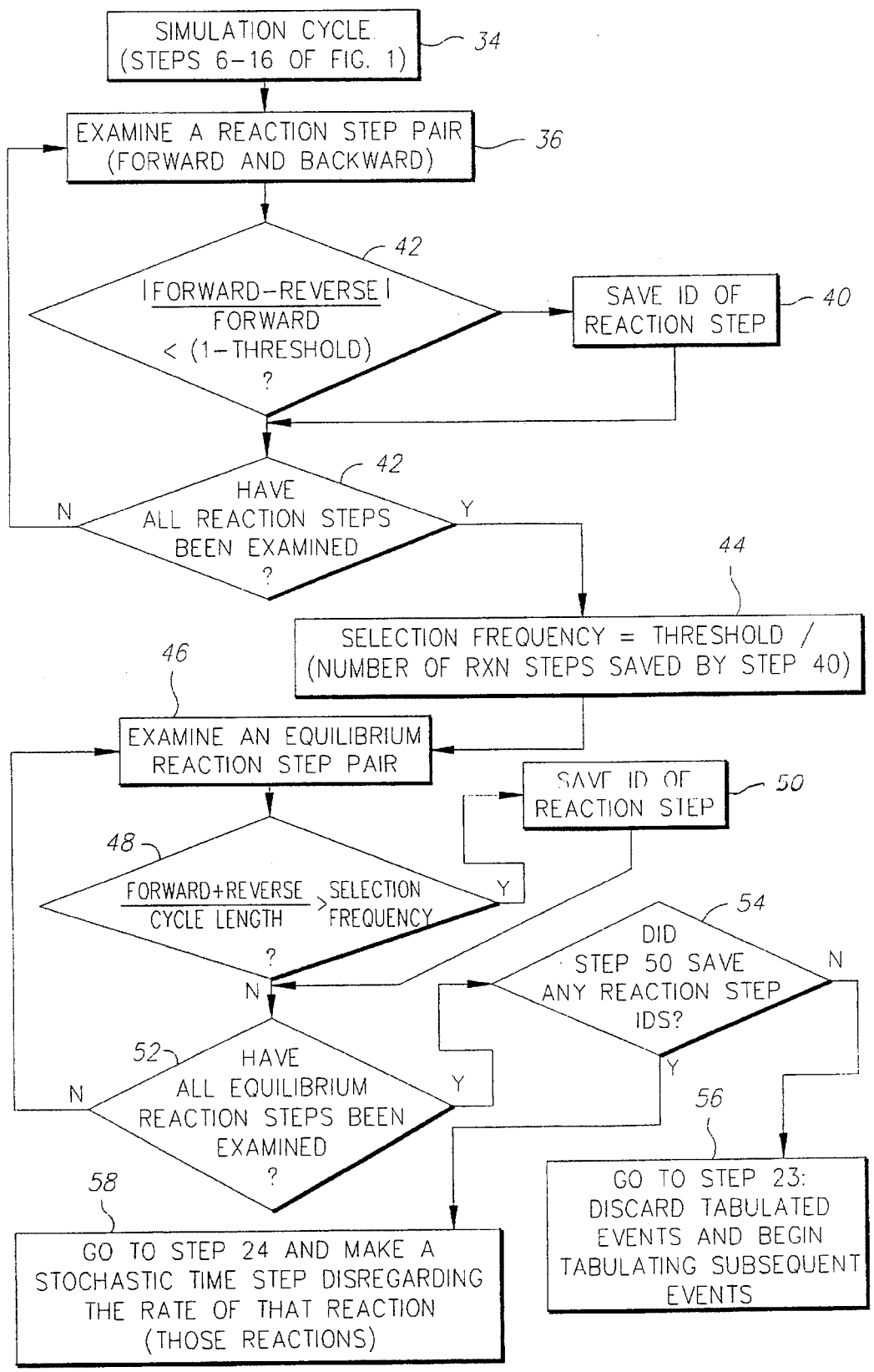
FIG. 3 is a more detailed flowchart of one of the steps of FIG. 1.

A more detailed description of the operation of step 22, as illustrated in FIG. 3, will now be given. Step 34 of FIG. 3 schematically represents the simulation iteration, or cycle, of steps 6–10 of FIG. 1, where step 12 has indicated that sufficient events have been tabulated.

Step 22 of FIG. 1 then executes the procedure of FIG. 3, beginning with step 36. In step 36, an iterative procedure is begun, in which a pair of reaction steps, representing the two directions of a reaction being simulated, is tested for the equilibrium condition. In a generalized simulation, in which it is foreseen that all possible reactions can proceed in either direction, there is such a pair of reaction steps for each reaction. In the simple example of FIG. 2, the reaction in which A changes to B, and vice versa, is such a pair. Step 36 obtains the event counts for the two directions of the selected reaction steps, or counts the number of occurrences of each direction from the Bunker-type array.

Next, step 38 tests these two values for the equilibrium condition. Preferably, equilibrium is detected as a condition in which the numbers of occurrences of each direction of the reaction step are approximately the same. Because events are selected stochastically, there will be some variation in the event counts for a finite sample of events. Therefore, a threshold value is used to define the scope of variation in counts for the two directions which will nonetheless be considered as equilibrium.

Step 38 makes the following calculation: The absolute value of a difference is obtained between the counts for the two directions. This value is normalized. In a preferred implementation, the normalization is based on the total number of events for the forward direction. Alternatively, it could be based on the total number of events in the reverse direction or in both directions, or on the total number of events for all of the reaction steps of the simulation. This latter is also called "cycle length," and is discussed below. Note that, if either the number of events in the forward direction or in the reverse direction is used as the denominator for the normalization, a test (not shown) should be used on that denominator, to avoid the possibility of dividing by zero.

The result is a value varying between 0 (indicating equilibrium, the same number of events for both directions) and 1 (0 events in one direction). This resultant value is then compared with a threshold value. In a preferred implementation, the threshold value is a value between 0 and 1. The closer this value is to 1, the closer to equal the counts must be for equilibrium. Thus, if 1 minus the threshold value is greater than the above resultant value, then equilibrium is detected.

If equilibrium is detected, then the identity of the equilibrium reaction is saved (step 40). In any event, the simulation proceeds to a test (step 42) for whether all of the reactions being run in the simulation have been tested for equilibrium. If any reactions remain to be tested, the simulation returns to step 36 to perform another iteration and check the next pair of reaction steps. If all of the reactions have been tested, then the simulation proceeds to step 44.

A simulator according to the invention temporarily excludes a reversible reaction step from its time step calculation and event selection if (i) the reaction is in equilibrium, and (ii) a suitably large number of occurrences of the reaction have taken place, relative to the other reactions. For those reactions found to be in equilibrium, the second condition is now tested for. The simulation according to the invention allows for the fact that simulator performance can be improved by skipping more than one reaction, if more than one reaction satisfies the above two conditions. However, detecting the second condition depends on the number of reactions satisfying the two conditions.

Therefore, in step 44, a selection frequency is calculated for use in making the test for the second condition. A threshold value is divided by the number of reaction step pairs found to be in equilibrium by steps 36 and 38, whose identities were saved by step 40. The threshold value is preferably normalized between 0 and 1. For instance, the threshold value is 0.9, if it is desired that a single equilibrium reaction step shall account for 9 out of every 10 events, in order to satisfy the second condition. Thus, in a system where two reaction steps are found to be in equilibrium, this calculation produces a value of 0.9/2=0.45. That is, one of the two equilibrium reaction steps will satisfy the second test of 45 out of every 100 events tabulated are for that reaction step, in one direction or the other.

The test just described assumes approximately equal probabilistic weight for the reversible reaction steps. Another approach is to weight the threshold value according to relative probabilities of reversible steps. If one reversible pair of reaction steps has a reaction rate double that of a second reversible pair of reaction steps, then according to the above-described approach, only the first pair of reaction steps would satisfy both tests and be excluded. However, in the alternative approach, different thresholds are set for different reaction steps. For example, if a threshold of 60% of the total reaction rate were set for the first reversible pair of reaction steps, and 30% for the second, then both reversible pairs would satisfy both tests, and both would be excluded from the time step calculation and event selection.

After this selection frequency value is calculated, an iterative procedure is executed for each of the equilibrium reactions. In step 46, the tabulated event counts for one of the equilibrium reaction steps saved by step 40 are obtained. In step 48, the sum of the event counts for both directions is normalized, by dividing the sum by the cycle length, i.e., the total number of events, for all reactions of the simulation, which were tabulated up until the test of step 16 was satisfied. Again, the normalization factor (the denominator) may alternatively be set to the values discussed above in connection with step 38. The normalized event count is then compared with the selection frequency value calculated in step 44. If that value is greater than the selection frequency, then this reaction step satisfies the second condition. Its identity is saved in step 50.

In either event, a test is made in step 52 to determine whether any of the equilibrium reaction steps remain to be tested. If so, the simulation returns to step 46 for the next iteration. If not, a test is made in step 54 to determine whether any of the reaction steps are both (i) in an equilibrium condition, and (ii) have a high reaction rate, relative to the other reaction steps. Any such reaction steps satisfying both conditions will have been saved by step 50.

If there are no such reaction steps, then the step 22 procedure given in detail in FIG. 3 exits through step 56, and returns to step 23 of FIG. 1. The event history is cleared (step 23), and the simulation returns to step 6 to begin accumulating event for the next test. If any such reaction steps were saved by step 50, then the procedure given in FIG. 3 exits through step 58, and proceeds to step 24 of FIG. 1. The remainder of FIG. 1, starting with step 24, will now be discussed.

If step 22 identifies one or more reaction steps which satisfy both the conditions of an equilibrium state and a high reaction rate, relative to the other reactions in the simulation, then the conventional stochastic simulation of steps 8–16 is not used. Rather, an alternate sequence of steps is executed.

First, in step 24, the tabulated event history is cleared, in the same manner as described in connection with step 23.

Then, a total reaction rate for the low rate or non-equilibrium reactions (that is, all the reactions not identified by step 22) is calculated in step 26, using the reaction rates just calculated in step 6. In accordance with the invention, a time step calculation is then made in step 28, taking into account only the lower-rate, non-equilibrium reactions and omitting the higher rate, equilibrium reaction or reactions detected in step 22. This calculation is made using equation (1), except that the denominator only takes into account the lower-rate, non-equilibrium reactions. As a consequence, the time step calculated in step 28 of FIG. 1 will be greater than the corresponding time step that would have been calculated by step 8 if a conventional stochastic simulation were being made.

The time value for the simulation is updated in step 30, similarly to that which would be done in step 10. In step 32, an event among the non-equilibrium reactions is selected and executed, thereby causing a change in the system state (i.e., a change in the reactant populations or concentrations). This state change influences the values of the reaction probabilities which will be calculated in the next iteration of the simulation.

Finally, the simulation proceeds to step 18, to again test for the end of the simulation interval. If the end of the interval has not yet been reached, the simulation returns to step 6 for the next series of iterations. If it has been reached, the simulation ends at step 20.

Thus, when one or more high-rate, equilibrium reactions are detected, the method according to the invention is advantageously able to reduce the amount of unproductive processing by eliminating the equilibrium reaction rate or rates from its time step calculation. As a result, time steps for which the equilibrium reaction step or steps is disregarded are longer, and the reaction events which are actually simulated (step 30) are those non-equilibrium reaction steps which move the simulation on toward completion.

It will still be the case that some of the equilibrium reaction steps will be simulated, while the events are being tabulated for the test. However, each time that steps 24 through 32 are executed once, a series of consecutive iterations of steps 8 through 16 is avoided. The number of iterations of steps 8 through 16 saved by excluding the high-rate, equilibrium reaction or reactions is the average number of consecutive occurrences of the high-rate, equilibrium reaction between successive occurrences of any lower-rate or non-equilibrium reactions. Thus, fewer total events are simulated because of the longer time steps and the: elimination of back-and-forth simulation of equilibrium events. As a consequence, the simulation is advantageously completed in less real time than would be the case, with a conventional stochastic simulation.

It is possible that all reaction steps in a given simulation are reversible, and that, under a given condition, all of the reaction steps satisfy the test of step 38 for equilibrium. In such a situation it is possible that, depending on the selection frequency threshold value or value used in step 48, step 48 might detect that all of the reaction steps also satisfy this second test. If they all did so, then there would be no low rate or non-equilibrium reactions left, upon which to base the next time step calculation and event selection. This is a "last extremity" situation, which will not normally occur, and therefore is not illustrated in FIG. 3. If it does occur, in effect, the simulation stops. However, the simulation could be modified to operate in a conventional manner, as per steps 6–16 of FIG. 1, when such a situation is detected.

Experiments have provided a reduction in execution time by a factor on the order of 10, with some variation depending on the mechanism being simulated, the data array size, and the equilibrium pattern recognition cycle length. However, because the non-equilibrium reaction events are, in the long run, simulated at the same frequency as they would be in a conventional stochastic simulation, accurate simulations have been achieved.

Because, after each execution of steps 24 through 32, a new batch of events is tabulated for the next test, a reaction step which falls out of equilibrium, or whose reaction rate drops, will be promptly detected, and its events will not continue to be excluded.

Figure 4:
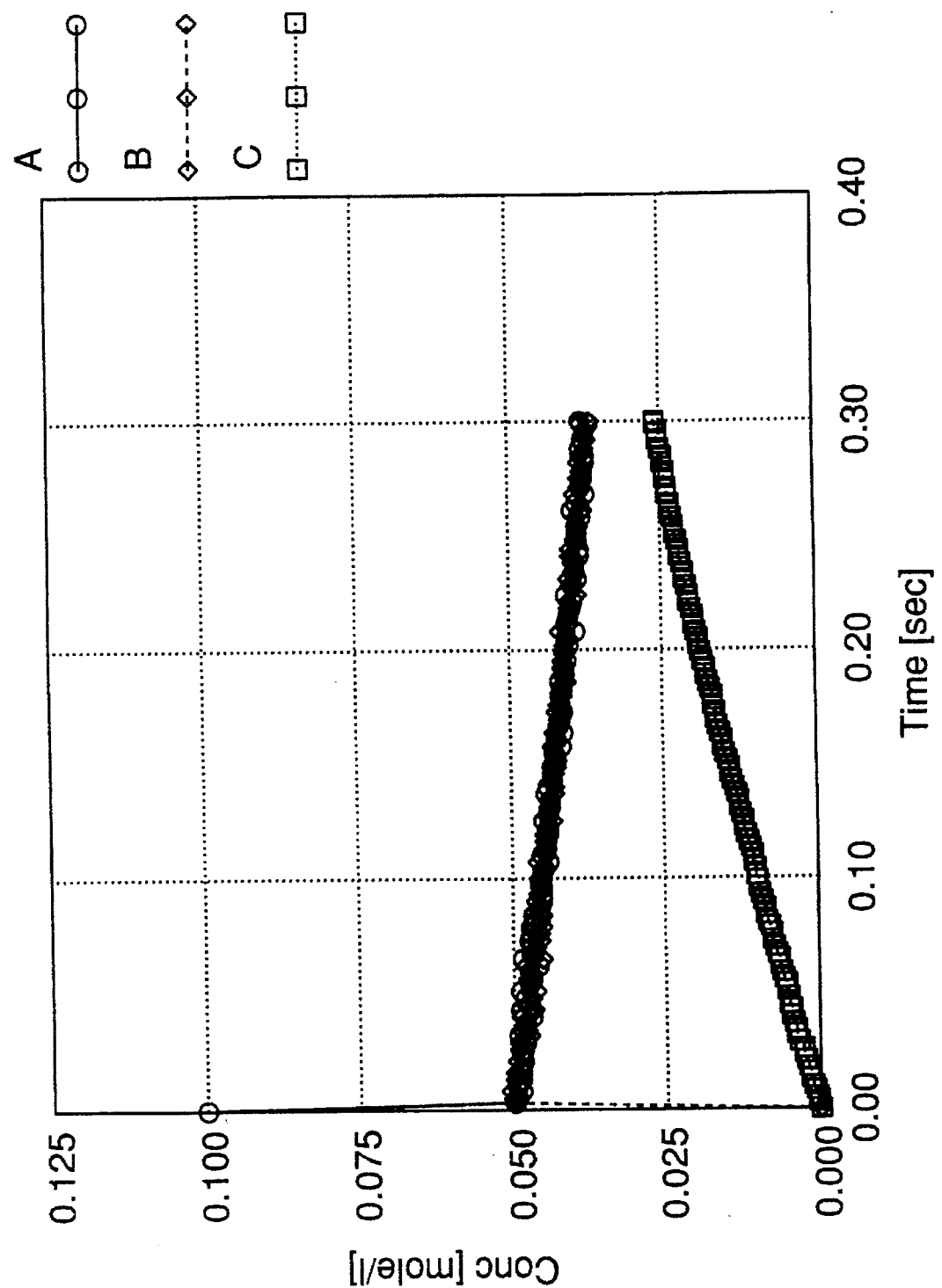
FIG. 4 is a graph of a hypothetical simulation performed by a conventional simulator.
Figure 5:
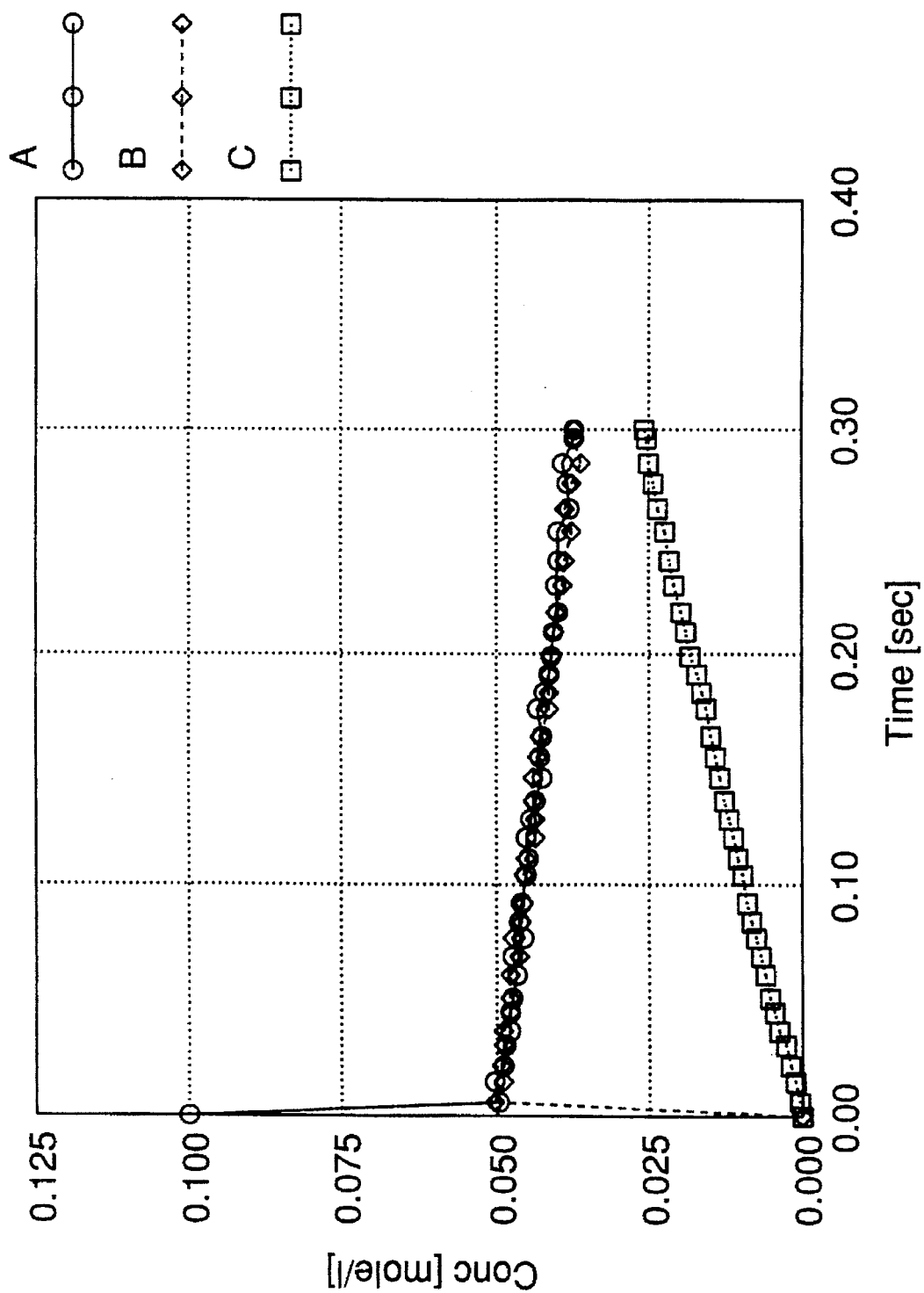
FIGS. 5 and 6 are graphs of the hypothetical simulation of FIG. 4, performed in accordance with the invention.
Figure 6:
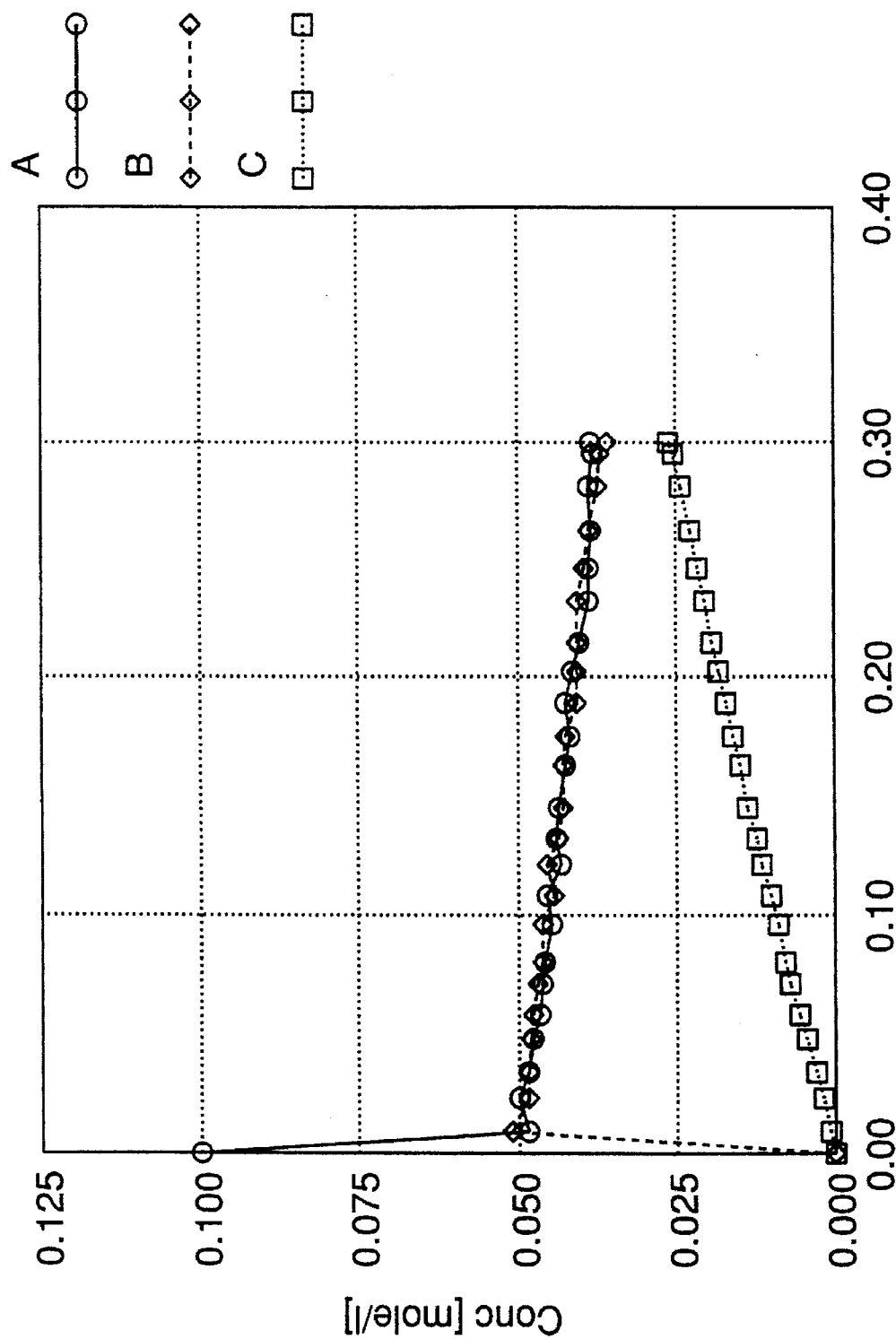

FIGS. 4, 5, and 6 are graphs of a simulation of the hypothetical system of FIG. 2, in which reactants A and B convert to each other in equilibrium, and, less frequently, the reactant B converts into a reaction product C. An initial population of 7500 A particles (i.e., molecules) is provided. As shown, the A and B populations quickly become equal, and then slowly fall, as the C population slowly rises front an initial value of 0.

For this example, 100 events are tabulated (steps 8–16 of FIG. 1) to satisfy step 16. More generally, the optimum number of events to be tabulated before making the step 22 test depends on the number of reversible steps in the reaction mechanism being simulated. Here, 100 events is a preferred event count for a mechanism in which only one reaction is reversible. For a mechanism having X number of reversible reactions, an event count of 50X to 100X events is preferred. However, the event count may vary in any suitable fashion.

Each of the plots in the graphs of FIGS. 4, 5, and 6 consists of a line, and symbols (circles, diamonds, and squares) superimposed thereon, to indicate the times at which reaction step events took place. An easy-to-read key to the three symbols is given in the upper right corner of each FIG.

The simulation of FIG. 4 was done using a conventional simulator which does not attempt to identify the equilibrium reaction between A and B. This simulation, which covered a 0.3 second period of simulation time, required 3073 seconds of real time to execute. For the time scale used, even though only 5% of the available data points were shown on the graphs, the event symbols are so densely crowded together that it is difficult or impossible to make out individual symbols.

By contrast, the simulation of FIG. 5 employed a method in accordance with the invention, for detecting the equilibrium condition. Starting with the same population of A particles, and running for the same simulation time, the simulation of FIG. 5 required only 105 seconds of real time. In accordance with the invention, high-rate, equilibrium reaction step events have been omitted, and longer time steps have been made. Accordingly, it will be seen on the graph that the symbols are much less densely crowded together, and some individual symbols cart be discerned. The number of events occurring between print cycles is the same as that for FIG. 4, but in FIG. 5, all available event points are shown. The overall shape, slope, etc., of the plots of FIG. 5 match those of FIG. 4, indicating that the method of the invention did not cause a loss of accuracy of the simulation. However, the reduced number of symbols on the graphs represents the processing time savings brought about by reducing the number of iterations of steps 8–14.

FIG. 6 is a graph of the same simulation as FIG. 5, except that the initial total reactant population was reduced to 5000 A particles. This reduction in the initial population of particles tends to reduce the accuracy of conventional simulations, because it barely represents the full range of probabilities. However, a simulation in accordance with the invention produces better accuracy, even with the smaller population of particles, possibly because direct simulation of equilibrium steps makes up a smaller portion of the simulation time base.

The simulation of FIG. 6 required only 49 seconds of real time, because the smaller number of particles allowed larger time steps to be taken with each event cycle, so fewer total events are needed to reach a particular time in the simulation. However, it will again be observed that the shapes and slopes of the curves still retain close conformity to the curves of FIG. 4, indicating that good simulation accuracy has still been preserved.

Figure 7:
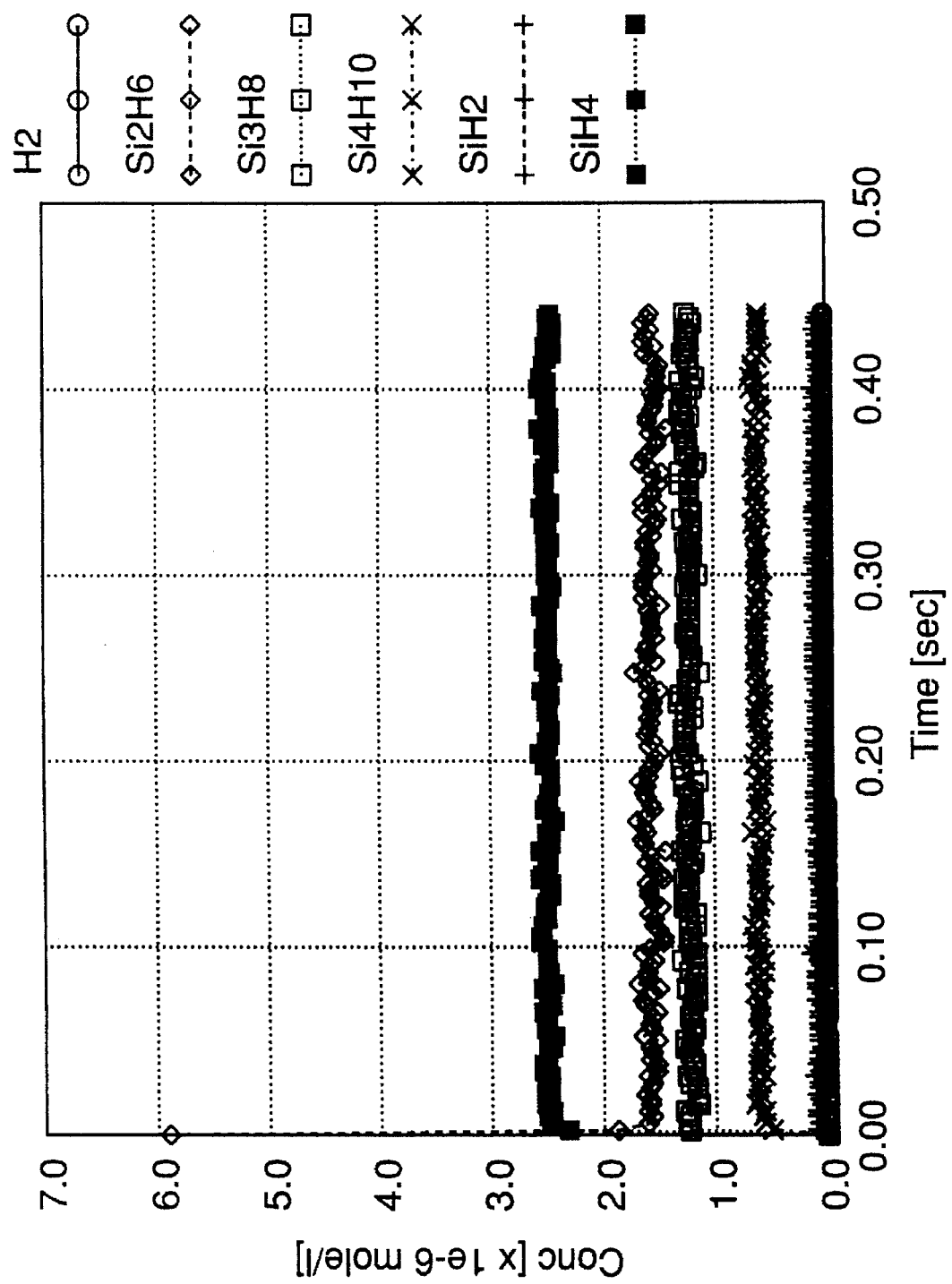
FIG. 7 is a graph of a second hypothetical simulation performed by a conventional simulator.
Figure 8:
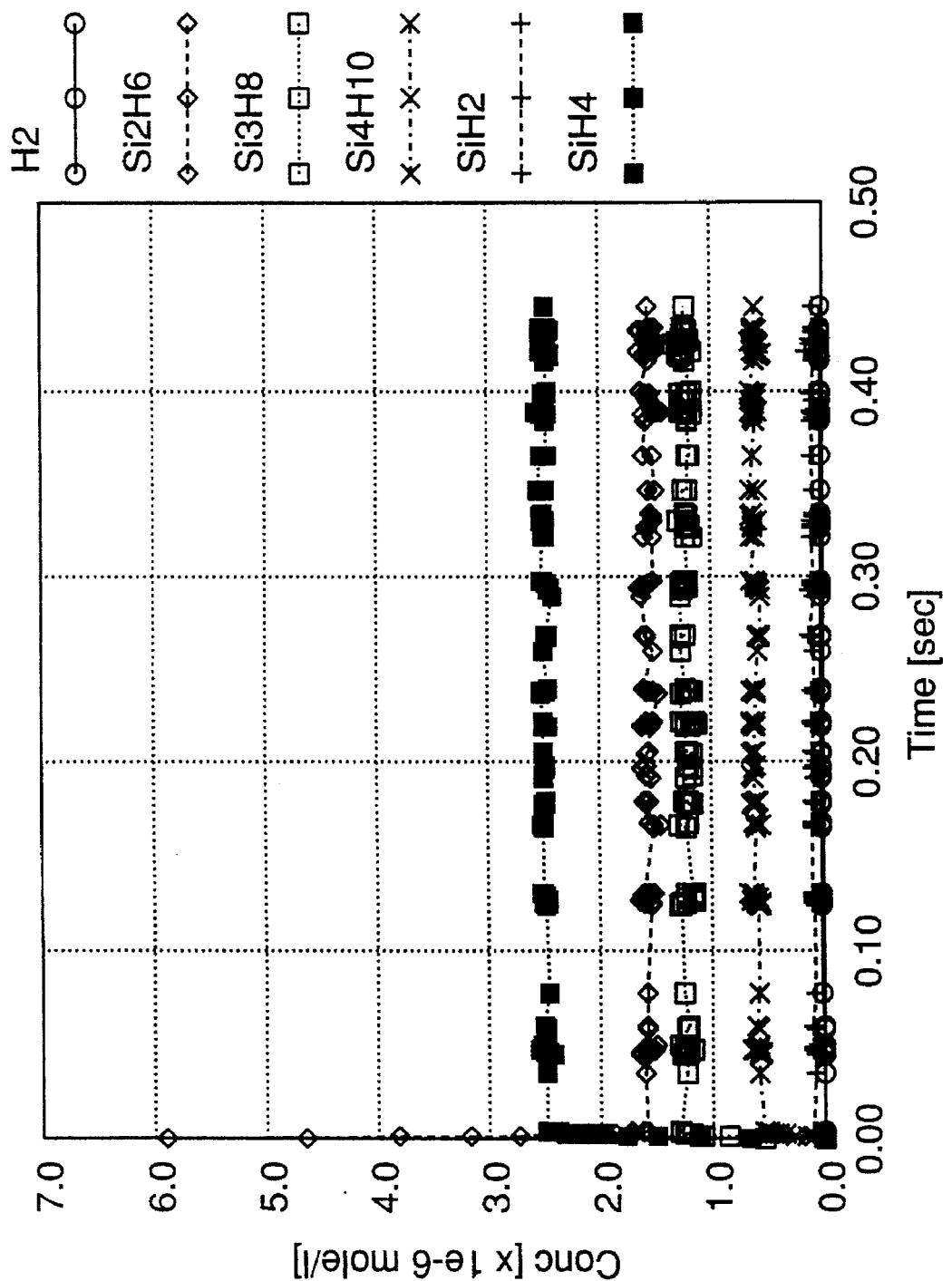
FIG. 8 is a graph of the second hypothetical simulation of FIG. 7, performed in accordance with the invention.

A second example of a simulation is given in FIGS. 7 and 8. The simulation is based on a mechanism for growing a chemical vapor deposition of silicon from silane and disilane, described in Meyerson, Scott, and Tsui, "Experimental and Chemical Kinetic Modeling Study of Silicon CVD from Monosilane and Disilane," CHEMTRONICS, vol. 1, December 1986, pp. 150–155. An initial population of 3000 particles of $Si_2H_6$ is provided. Under the conditions defined for the simulation, this compound changes into a family of various silicon hydride compounds, and $H_2$ gas molecules are also produced. This reaction mechanism is presented as an example of a mechanism in which several high-rate, equilibrium reactions exist essentially simultaneously.

As shown in the conventional simulation of FIG. 7, each of the species quickly reaches a quantity, which thereafter remains essentially constant. Thus, the reactions taking place after this steady-state condition is reached are either in equilibrium, or have low reaction rates. The conventional simulation of FIG. 7 is shown as having a large number of frequently occurring events. This is evidenced by the high density of symbols on the plots of the graph. (Again, refer to the key on the upper right part of FIG. 7 for the symbols used for each species.) However, because the species quantities remain essentially constant, as evidenced by the essentially flat plots on the graph, it will be seen that the reactions are all essentially in equilibrium. The simulation of FIG. 7 was made in 328 seconds.

FIG. 8, by contrast, shows a simulation of the same reaction mechanism in accordance with the invention. Again, the mechanism begins with an initial quantity of $Si_2H_6$, quickly moves to steady state quantities of the various species, and is thereafter essentially in equilibrium. However, in accordance with the invention, from time to time step 16 detects that sufficient events have been tabulated to check for high-rate, equilibrium reaction steps. At these times, step 22 detects several reactions in equilibrium. Accordingly, step 26 calculates a time step substantially longer than those calculated by step 8. These longer time steps appear in the graph of FIG. 8 as gaps between bunches of events. Because of the processing time savings provided by the method of the invention, the simulation of FIG. 8 required only 36 seconds. Again, it will be seen that the graphs of FIGS. 7 and 8 conform to each other well, indicating that the simulation according to the invention achieves good accuracy, while saving processing time.

What is claimed is:

1. A method for stochastic simulation of a process including a plurality of reactions having respective reaction rates, at least one of the reactions being reversible, the stochastic simulation proceeding by making a sequence of steps in which, for each step, one of the reactions takes place, each successive one of the steps being made from a current state of the simulation to a new state of the simulation, the new state being based on the current state of the stochastic simulation and the reaction which took place, the method comprising the steps of:

identifying a reversible reaction of the process which is in equilibrium; and making a step of the simulation based on the reaction rates for the reactions of the process, but omitting the reaction rate for the reaction identified by the step of identifying.

2. A method as recited in claim 1, wherein the step of identifying includes:

making a series of steps of the stochastic simulation, each of the steps including selecting one of the reactions as an event of that reaction and simulating the selected event; and tabulating occurrences of the events selected by the step of making a series of steps.

3. A method as recited in claim 2, wherein the step of identifying further includes checking the tabulated occurrences to determine:

(i) whether, during the series of steps, events of a given reaction which occured in both directions were within a first threshold of being the same number of events in each direction, and (ii) whether, during the series of steps, the number of events of the given reaction exceeded a second threshold portion of the total tabulated occurrences of all reactions.

4. A method as recited in claim 2, wherein the step of tabulating includes maintaining event counts for the occurrences of the reactions.

5. A method as recited in claim 2, wherein the step of tabulating includes storing symbols related to the occurrences of the reactions in a data array.

6. A method as recited in claim 1, wherein the step of making a step of the simulation includes:

calculating a time step based on the reaction rates for the reactions of the process, but omitting the reaction rate for the reaction identified by the step of identifying;

selecting an event from among the reactions of the process, but omitting the reaction identified by the step of identifying, and simulating the selected event.

7. A method as recited in claim 6, wherein the step of identifying includes:

making a series of steps of the stochastic simulation, each of the steps including selecting one of the reactions as an event of that reaction and simulating the selected event; and tabulating occurrences of the events selected by the step of making a series of steps.

8. A method as recited in claim 7, further comprising the step of discarding the tabulation of the events produced by the step of tabulating and used in the step of identifying the reaction, whose reaction rate is omitted in the step of calculating a time step, and which is omitted in the step of selecting an event.

9. A method as recited in claim 7, further comprising the steps of:

keeping a predetermined portion of the tabulation of the events, produced by the step of tabulating and used in the step of identifying the reaction, whose reaction rate is omitted in the step of calculating a time step, and which is omitted in the step of selecting an event, thereby making the predetermined portion available for use in a subsequent execution of the step of identifying; and discarding the remainder of the tabulation of the events.

10. A system for stochastic simulation of a process including a plurality of reactions having respective reaction rates, at least one of the reactions being reversible, the stochastic simulation proceeding by making a sequence of steps in which, for each step, one of the reactions takes place, each successive one of the steps being made from a current state of the simulation to a new state of the simulation, the new state being based on the current state of the stochastic simulation and the reaction which took place, the system comprising:

means for identifying a reversible reaction of the process which is in equilibrium; and means for making a step of the simulation based on the reaction rates for the reactions of the process, but omitting the reaction rate for the reaction identified by the means for identifying.

11. A system as recited in claim 10, wherein the means for identifying includes:

means for making a series of steps of the stochastic simulation, each of the steps including selecting one of the reactions as an event of that reaction and simulating the selected event; and means for tabulating occurrences of the events selected by the means for making a series of steps.

12. A system as recited in claim 11, wherein the means for identifying further includes means for checking the tabulated occurrences to determine:

(i) whether, during the series of steps, events of a given reaction which occured in both directions were within a first threshold of being the same number of events in each direction, and (ii) whether, during the series of steps, the number of events of the given reaction exceeded a second threshold portion of the total tabulated occurrences of all reactions.

13. A system as recited in claim 11, wherein the means for tabulating includes means for maintaining event counts for the occurrences of the reactions.

14. A system as recited in claim 11, wherein the means for tabulating includes means for storing symbols related to the occurrences of the reactions in a data array.

15. A system as recited in claim 11, wherein the means for making a step of the simulation includes:

means for calculating a time step based on the reaction rates for the reactions of the process, but omitting the reaction rate for the reaction identified by the means for identifying;

means for selecting an event from among the reactions of the process, but omitting the reaction identified by the means for identifying, and means for simulating the selected event.

16. A system as recited in claim 15, wherein the means for identifying includes:

means for king a series of steps of the stochastic simulation, each of the steps including selecting one of the reactions as an event of that reaction and simulating the selected event; and means for tabulating occurrences of the events selected by the means for making a series of steps.

17. A system as recited in claim 16, further comprising means for discarding the tabulation of the events produced by the means for tabulating and used by the means for identifying the reaction, whose reaction rate is omitted by the means for calculating a time step, and which is omitted by the means for selecting an event.

18. A system as recited in claim 16, further comprising:

means for keeping a predetermined portion of the tabulation of the events, produced by the means for tabulating and used by the means for identifying the reaction, whose reaction rate is omitted by the means for calculating a time step, and which is omitted by the means for selecting an event, thereby making the predetermined portion available for use in a subsequent operation of the means for identifying; and means for discarding the remainder of the tabulation of the events.

* * * * *